United States Patent
Folco et al.

(10) Patent No.: US 9,781,565 B1
(45) Date of Patent: Oct. 3, 2017

(54) MOBILE DEVICE INFERENCE AND LOCATION PREDICTION OF A MOVING OBJECT OF INTEREST

(71) Applicant: International Business Machines Corporation, Armonk, NY (US)

(72) Inventors: Rafael C. S. Folco, Santa Barbara d'Oeste (BR); Breno H. Leitao, Campinas (BR); Desnes A. Nunes do Rosario, Pinheiros (BR); Jose F. Santiago Filho, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/169,938

(22) Filed: Jun. 1, 2016

(51) Int. Cl.
| | |
|---|---|
| H04W 4/02 | (2009.01) |
| H04L 29/08 | (2006.01) |
| G10L 25/72 | (2013.01) |
| G06K 9/00 | (2006.01) |
| G06T 7/20 | (2017.01) |
| H04W 88/08 | (2009.01) |
| H04W 88/02 | (2009.01) |

(52) U.S. Cl.
CPC ........ *H04W 4/023* (2013.01); *G06K 9/00288* (2013.01); *G06K 9/00771* (2013.01); *G06T 7/2033* (2013.01); *G10L 25/72* (2013.01); *H04L 67/306* (2013.01); *H04W 4/027* (2013.01); *H04W 4/028* (2013.01); *H04W 88/02* (2013.01); *H04W 88/08* (2013.01)

(58) Field of Classification Search
CPC ..................................................... H04W 4/023
USPC ........................................... 455/456.1–456.6
See application file for complete search history.

(56) References Cited

U.S. PATENT DOCUMENTS

| | | | |
|---|---|---|---|
| 5,434,617 A | 7/1995 | Bianchi | |
| 6,690,374 B2 | 2/2004 | Park et al. | |
| 6,947,073 B1 | 9/2005 | Seal | |
| 7,197,320 B2 * | 3/2007 | Joseph | H04W 4/02 |
| | | | 455/414.2 |
| 2009/0268030 A1 | 10/2009 | Markham | |
| 2011/0217962 A1 * | 9/2011 | Leung | G01S 13/003 |
| | | | 455/414.2 |

(Continued)

FOREIGN PATENT DOCUMENTS

JP 2015228615 A 12/2015

OTHER PUBLICATIONS

Lim, et al., "Introduction of Smart Monitoring and Tracing System Using GPS Information," International Journal of Computer and Communication Engineering, vol. 1, No. 2, Jul. 2012, pp. 107-110 http://www.ijcce.org/papers/30-N018.pdf.

(Continued)

*Primary Examiner* — Michael T Vu
(74) *Attorney, Agent, or Firm* — Joseph W. Cruz

(57) ABSTRACT

A first set of data may be received indicating that an object of interest has been identified. A second set of data may be received indicating a first location of where the object of interest was identified. The first location may correspond to a geographical area. In response to the receiving of the first set of data and the second set of data, the first location may be associated with a first transceiver base station. In response to the associating, a first list of one or more mobile devices may be obtained that are within an active range of the first transceiver base station.

17 Claims, 8 Drawing Sheets

(56) References Cited

U.S. PATENT DOCUMENTS

2011/0298930 A1 12/2011 Allegra et al.
2013/0201329 A1 8/2013 Thornton et al.
2014/0362225 A1 12/2014 Ramalingamoorthy et al.
2015/0381940 A1 12/2015 Hari et al.

OTHER PUBLICATIONS

Muda et al., "Voice Recognition Algorithms using Mel Frequency Cepstral Coefficient (MFCC) and Dynamic Time Warping (DTW) Techniques," Journal of Computing, vol. 2, Issue 3, Mar. 2010, ISSN 2151-9617, pp. 138-143.
Prigg, "Now there's no escape from CCTV . . . Researchers reveal software that can track people as they walk from camera to camera in real time," MailOnline, Science & Tech, published Nov. 18, 2014, 3 pages, printed Feb. 17, 2016, © Associated Newspapers Ltd, http://www.dailymail.co.uk/sciencetech/article-2838633/Software-track-people-walk-camera-camera-say-tracked-Boston-bombers-hours.html.
Russell et al., "Artificial Intelligence a Modern Approach, Third Edition," Pearson Education, Inc., Chapter 15, Upper Saddle River, New Jersey, Copyright 2010, 2003, 1995, 50 pages.

\* cited by examiner

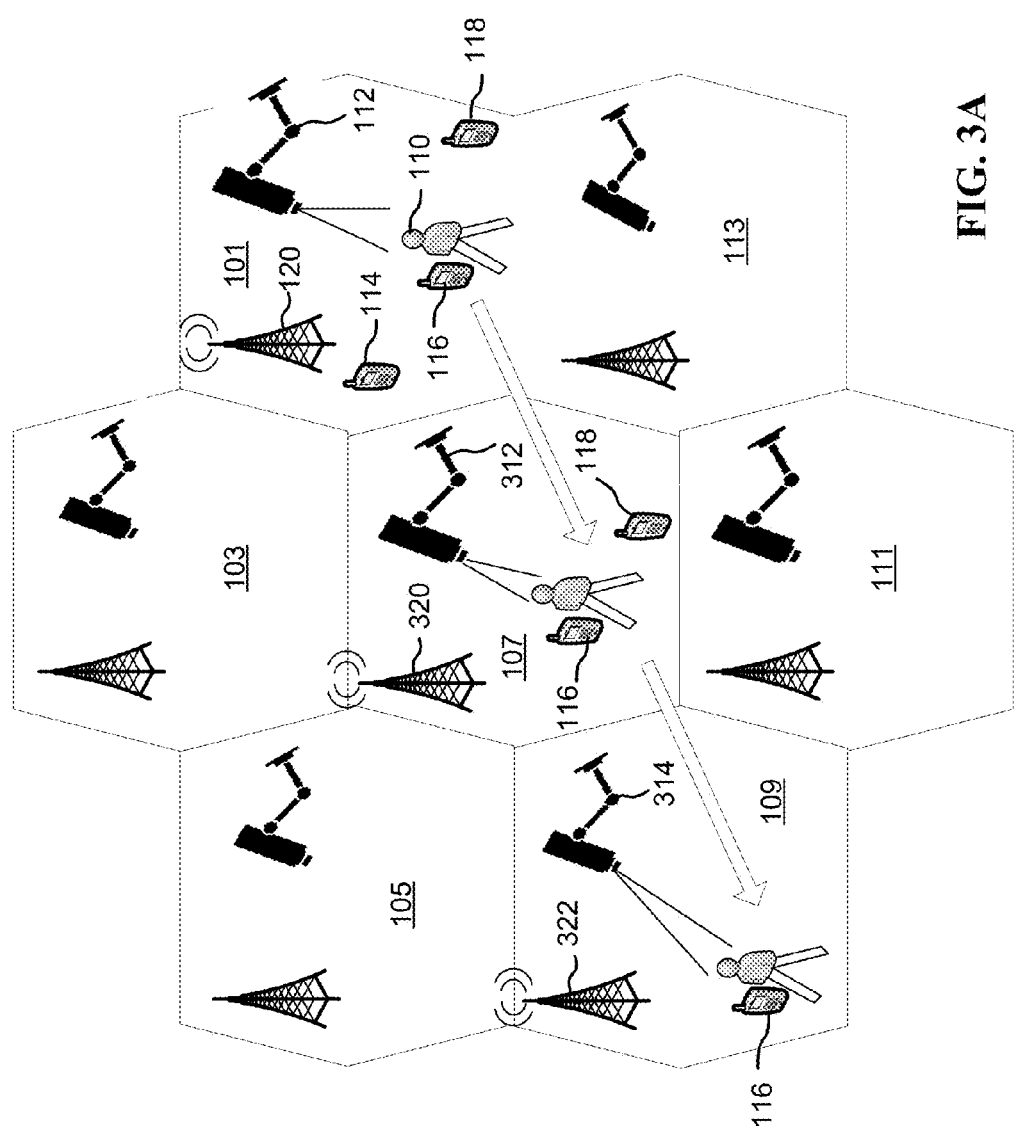

MOBILE DEVICE INFERENCE AND LOCATION PREDICTION OF A MOVING OBJECT OF INTEREST

BACKGROUND

This disclosure relates generally to object tracking systems, and more specifically, to inferring a mobile device of a particular object of interest that has been identified and predicting a location of where the particular object of interest will move at a future time.

Law enforcement officials, public safety officials, or other entities may be continually searching for objects of interest such as people. These people may have, for example, committed serious felonies or have been reported as missing. Whether the searching includes a hot pursuit of such individuals or an extended search, it is important to catch these people as soon as possible for various reasons such as keeping a community safe, helping these people, and/or making the capturing of these people as effortless and accurate as possible.

SUMMARY

One or more embodiments are directed to a computer-implemented method, a system, and a computer program product. A first set of data may be received indicating that an object of interest has been identified. A second set of data may be received indicating a first location of where the object of interest was identified. The first location may correspond to a geographical area. In response to the receiving of the first set of data and the second set of data, the first location may be associated with a first transceiver base station. In response to the associating, a first list of one or more mobile devices may be obtained that are within an active range of the first transceiver base station.

BRIEF DESCRIPTION OF THE DRAWINGS

FIG. 3A is a diagram illustrating how an object of interest's mobile device may be inferred based on identifying the object of interest in multiple cell sites, according to embodiments.

Figure 1:
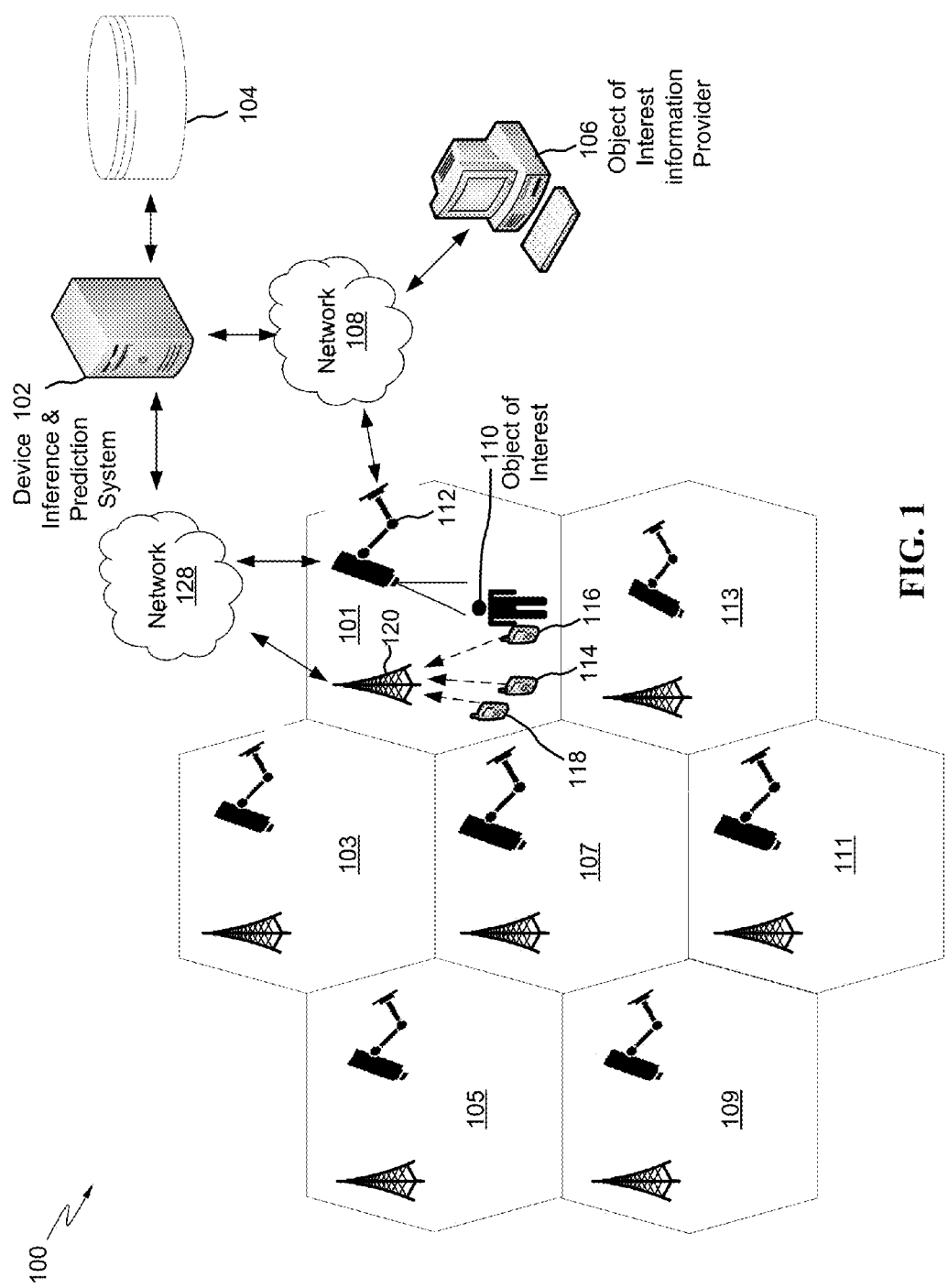
FIG. 1 is a block diagram of a computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to tracking systems, and more specifically, to inferring a mobile device of a particular object that has been identified. While the present disclosure is not necessarily limited to such applications, various aspects of the disclosure may be appreciated through a discussion of various examples using this context. For example, the aspects of the present disclosure also relate to generating a location prediction estimate of where an object of interest will arrive.

Although particular tracking systems, such as surveillance systems may be configured to capture images of particular objects, these data may be static and have limited use for entities such as law enforcement officials. For example, a surveillance system may capture an image of a crime. Law enforcement officials may first have to determine that the crime occurred in a particular area and then query every nearby business entity to determine whether the business entities utilize security cameras. The officials may then have to run through hours of surveillance for each of the business entities to find the crime in question. When the officials have captured the crime, they then may have to determine that the image is clear enough to generate suspects of the crime. In the meantime, the person of interest who committed the crime may have rapidly moved far from the scene of the crime by the time the law enforcement officials begin serious pursuit of the person. It may be useful for tracking systems to thus quickly identify objects of interest and notify appropriate parties.

It may also be useful for tracking systems to estimate a route or location that a fleeing object of interest will take and/or arrive at in order to quickly capture the objects of interest and keep them from endangering a community for example.

Further, a mobile device identifier (e.g., a phone number) of an object of interest may be useful for entities to obtain for various reasons. For example, if a person of interest was associated with a wanted suspect and that person of interest was identified, government officials may desire to deactivate the person's mobile device, obtain Equipment Identity Register (EIR) information in order to track the mobile device (and thus the person of interest), and/or infiltrate (gain unauthorized access to) the mobile device to obtain mobile data or intercept communication with other mobile devices in order to obtain knowledge of or prevent future crimes. In another example, a runaway teenager, lost child, or other missing person (e.g., an elderly person with Alzheimer's) may be identified and their associated mobile device EIR data may be utilized to track and find them.

Accordingly, embodiments of the present disclosure are directed to tracking systems that efficiently identify objects of interest, generate location prediction estimations and/or route estimations of objects of interest, and/or infer mobile device identifiers of objects of interest for the reasons stated above. As disclosed herein, the terms "object(s)," "object(s) of interest," or the like refers to any apparatus, a living being or any feature thereof (e.g., a human face), a machine, an article of manufacture, a sound pattern (e.g., a human speech pattern), or any other suitable tangible item that a user (e.g., a person or computing device) has stored information about (e.g., speech recognition and/or facial recognition digital fingerprints associated with the object of interest). For example, in some embodiments, the object of interest may be a particular missing person and/or a particular license plate that is fastened to a stolen vehicle.

FIG. 1 is a block diagram of a computing environment 100, according to embodiments. The computing environment 100 may include one or more of: an object of interest information provider 106, a device inference and prediction system 102 coupled to a datastore 104, the mobile devices 118, 114, and 116, a security camera 112 configured to identify the object of interest 110, a transceiver base station 120 (i.e., a base station, cell tower, and/or an access point in a cellular network, etc.) each or some of which may be communicatively coupled (e.g., via the network 128 and/or the network 108).

The computing environment 100 may also include various other base stations and/or security cameras that are associated with particular locations or geographical areas. Each cell site (e.g., cell site 103) may correspond to a particular range that a base station may transmit and/or receive particular signals (above or below a signal strength threshold). The particular range may be associated with a particular location/geographical area and distance (e.g., 2 square miles of a parcel of land). In some embodiments, each base station and/or security camera of each cell site may further be communicatively coupled to the object of interest information provider 106 and/or the device inference and prediction system 102. Accordingly, the components as shown to be associated with cell site 101 may be for illustrative purposes only, as the other cells' components may also communicate via the networks 108 and/or 128.

The computing environment 100 may also be associated with the cell sites 103, 101, 113, 111, 109, 105, and 107, as each or some of these cell sites may include their own respective base stations and/or security cameras. In some embodiments, the computing environment 100 includes/ does not include one or more components as illustrated. For example, microphones may be utilized instead of or in addition to the security camera 112 to perform voice recognition analysis to identify the object of interest 110, as described in more detail below. In another example, the computing environment 100 may not include the object of interest information provider 106. In some embodiments, the computing environment 100 may be implemented within a cloud computing environment, or use one or more cloud computing services. Consistent with various embodiments, a cloud computing environment may include a network-based, distributed/data processing system that provides one or more cloud computing services. Further, a cloud computing environment may include many computers, hundreds or thousands of them or more, disposed within one or more data centers and configured to share resources over the network 108 and/or 128.

In various embodiments, some or each of the components—e.g., the device inference and prediction system 102, the object of interest information provider 106, and the security camera 112—represent separate computing devices. In some embodiments, some or each of the components represent particular compute instances of a single computing device (e.g., program modules, computing components within a chassis, a blade server within a blade enclosure, an I/O drawer, a processor chip, etc.). In some embodiments, some or each of the components as illustrated in FIG. 1 may represent a single computing system that includes multiple computing devices responsible for a given task. For example, the device inference and prediction system 102 may represent a first computing device that infers a mobile device of the object of interest 110 and also represent a second computing device that predicts what route the object of interest 110 will take for future endeavors.

In some embodiments, the object of interest information provider 106 corresponds to a law enforcement computing device or other system that defines what a particular object of interest is and then provides the object of interest data (e.g., to the device inference and prediction system 102, the security camera 112, and/or a system associated with the base station 120). For example, a prisoner may have escaped from prison. In response, a user may upload the prisoner's picture (e.g., a digital fingerprint) to the object of interest information provider 106. The object of interest's 110 digital picture may then be transmitted to the security camera 112 such that the security camera 112 may identify the object of interest 110 based on matching the digital picture to the object of interest 110.

In some embodiments, the device inference and prediction system 102 corresponds to a central processing system that infers what mobile device the object of interest 110 is carrying or associated with and/or predicts where the object of interest 110 will travel, which is described in more detail below. These data may be based on information received from one or more security cameras and/or base stations, as described in more detail below.

The device inference and prediction system 102, the security camera 112, and/or the object of interest information provider 106 may communicate with each other via the network 108, which may be any suitable network such as a Personal Area Network (PAN), a local area network (LAN), a general wide area network (WAN), and/or a public network (e.g., the internet). In some embodiments, a system of the base station 120 may also communicate with any of the components (e.g., security camera 112, the object of interest information provider, etc.) via any suitable network. In some embodiments, the device inference and prediction system 102 may communicate with a system of the base station 120 via the network 128, which may also be any suitable network such as a cellular network or internet. In some embodiments, the networks 128 and 108 are the same networks.

The security camera 112 (or other non-security camera, such as a web cam) may represent a surveillance system. This system may be or include a computing device that stores one or more program instructions or data (e.g., facial recognition fingerprints, computer vision tracking algorithms, etc.). The security camera 112 and other security cameras may be scattered throughout and area and fastened to different objects such as in traffic lights, train stations, buses, parks, telephone poles, etc.

FIG. 1 illustrates that the object of interest 110 may be identified and an initiation of inferring an associated mobile device and/or generating a location prediction estimation or route estimation may be made. For example, in some embodiments, the object of interest information provider 106 first provides a digital fingerprint of a missing person (corresponding to the object of interest 110) to the security camera 112 (e.g., via the network 108). The security camera 112 may then match the digital fingerprint to an object to identify the object of interest 110. The security camera 112 may then transmit (e.g., via the network 108) a set of data to the device inference and prediction system 102 indicating that an object of interest has been identified (which may include an identifier (e.g., name) of the object of interest), and that the object of interest was identified at a particular location (corresponding to cell 101 and a geographical location). The particular location may correspond to an identifier (e.g., location 1) that is transmitted from the security camera and stored to the datastore 104. The device inference and prediction system 102 may then associate, in response to receiving the location identifier, the location with the transceiver base station 120. For example, the datastore 104 may include a database table that specifies for every location identifier record, what the corresponding base station is in an adjacent field of the record. A component of the datastore 104 (e.g., a database manager) may then read the record to obtain the information. The device inference and prediction system 102 may then transmit (e.g., via the network 128) a query message to the base station 120 system in order to determine active subscribers that are within a transmit/receive range (corresponding to a threshold value of signal strength) of the base station 120 (e.g., within the cell site 101). A system of the base station 120 may then transmit and the device inference and prediction system 102 may then obtain a list of the mobile devices—mobile device 114, 116, and 118—that are within an active range of the base transceiver station 120.

Figure 2:
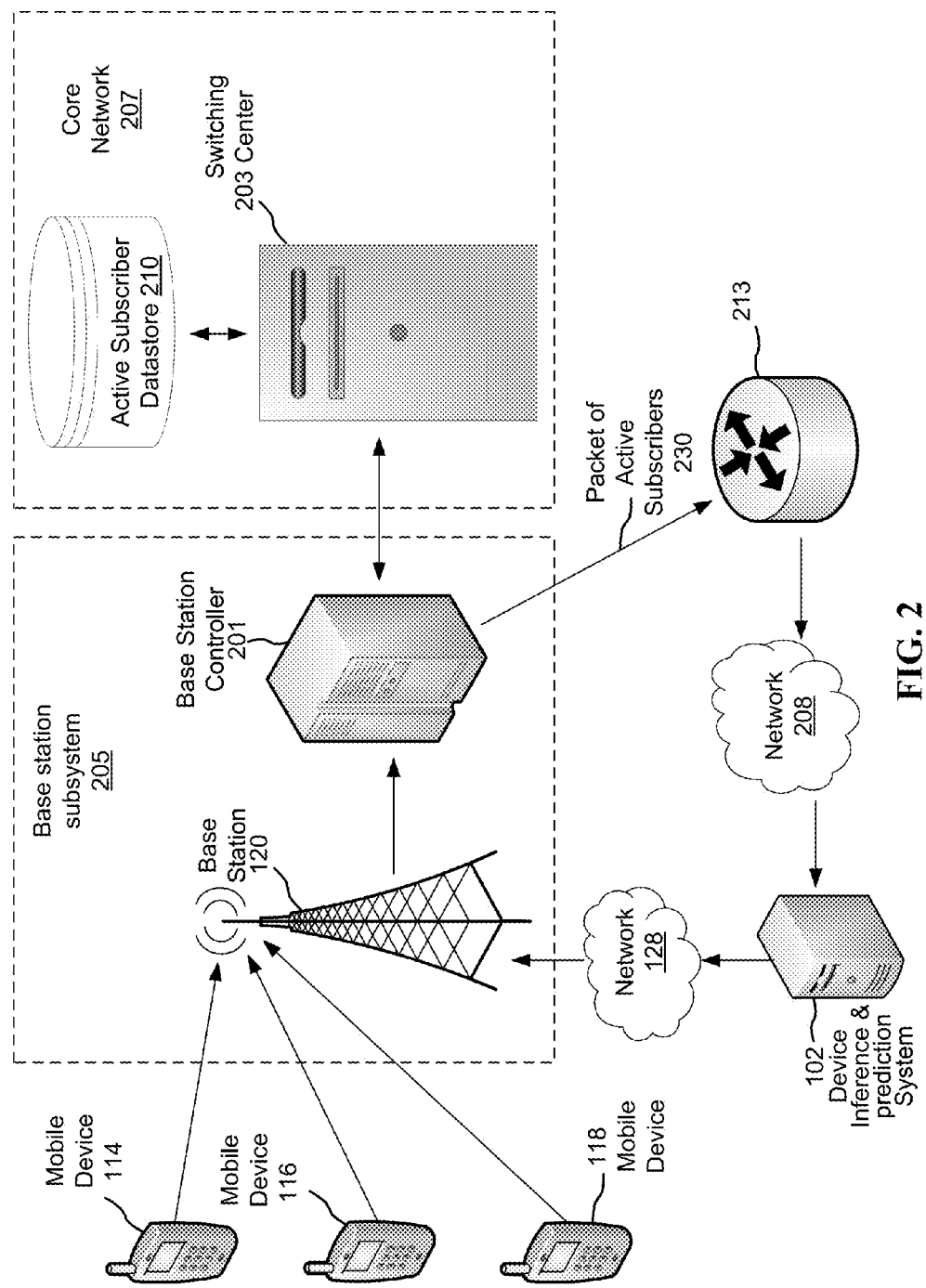
FIG. 2 is a diagram of an example cellular network illustrating how mobile device identifiers may be obtained in order to infer a mobile device of an object of interest, according to embodiments.

FIG. 2 is a diagram of an example cellular network illustrating how mobile device identifiers may be obtained in order to infer a mobile device of an object of interest, according to embodiments. FIG. 2 includes the mobile devices 114, 116, and 118 of FIG. 1, a base station subsystem 205, which includes the base station 120 of FIG. 1 and a base station controller 201, a core network 207, which includes an active subscriber datastore 210, and a switching center 203. FIG. 2 also includes the device inference and prediction system 102 of FIG. 1, which may be communicatively coupled (e.g., via the networks 128 and 208) to the base station subsystem 205. In some embodiments, some or each cell site (e.g., cell sites 103, 105, 109, 11, 113, and 107) may also be associated with its own base station controller, switching center, and active subscriber datastore, as illustrated in FIG. 2 for cell site 101.

The base station controller 201 controls one or more base stations and may perform multiple tasks. For example, the base station controller 201 may manage radio network tasks (e.g., radio frequency control) and control handover data between base stations that are under the base station controller's control. "Handover" data may be data that is passed from one base station to another. For example, when a person drives from one cell site to another while talking on a phone and/or while a person has a phone in possession and the phone is emitting an active or roaming signal, handover data may be passed from base station to base station.

The base station controller 201 may also be the intermediary between the base station 120 and the switching center 203. The switching center 203 (e.g., a mobile switching center (MSC)) performs communication switching functions such as call set-up, release of calls, routing of particular calls, routing of particular Short Message Server (SMS) text messages, communicating with other networks, and completing handover operations. For example, the base station controller 201 may detect that the mobile device 114 is falling below a signal strength threshold (i.e. approaching the edge of the cell site it is currently in) via information received from the base station 120. The base station controller 201 may then request handover assistance from the switching center 203. The switching center may then scan a list of adjacent cells and their associated base station controller to hand off data to the appropriate base station controller (i.e., the base station controller of where the mobile device 114 is now in or will be in).

The mobile switching center 203 may be communicatively couple to various datastores, such as the active subscriber datastore 210 in order to determine subscriber data (e.g., a mobile telephone number) and other information for call routing, obtaining active or roaming data, completing handoff operations, etc. The active subscriber datastore 210 (e.g., a Visitor Location Register (VLR) datastore) may include a list of subscribers (e.g., mobile device identifiers) associated with users (e.g., the object of interest 110) that are active or are roaming in a particular location associated with the base station 120 (i.e., the mobile devices are within a signal strength threshold of the base station 120). To be "active" means that one or more mobile devices register (e.g., broadcast) their location, identifier, and/or signal strength (and the signal strength is above a threshold and/or within a range) to the base station 120, which is then stored in the active subscriber datastore 210. Accordingly, active information may specify/infer where a current location of a mobile device is, particularly where mobile device triangulation occurs via signals obtained by a plurality of base stations. This registering may occur several times (e.g., 20 times) a minute to determine whether a mobile device is active in a particular cell site. Moreover, this registering may not be able to be turned off as long as the base station 120 is receiving an active signal above a threshold regardless of whether or not a mobile device is currently processing a phone call. Accordingly, the switching center 203 may be able to determine which mobile devices are currently roaming or are active in a particular cell site.

In some embodiments, the switching center 203 may also include other datastores, such as a Home Location Register (HLR) database, an authentication center (AuC), and an Equipment Identity Register (EIR). The HLR database may be associated with various subscriber details specifying which subscribers are authorized to use the core network 207. These subscriber details may include a customer ID, current customer VLR data, subscriber status, etc. The HLR database may also store details of every Subscriber Identity Module (SIM) card issued by a mobile phone operation, which includes International Mobile Subscriber Identity (IMSI) of mobile devices. These may be telephone numbers used by mobile phones to make and receive calls. The AuC may authenticate each mobile identifier attempting to connect to the core network 207. The EIR may store a list of mobile phone identifiers (e.g., International Mobile Station Equipment Identity (IMEIs)) that are banned and/or monitored from the cellular network. For example, a network may monitor a mobile device IMEI in order to track a stolen mobile phone.

FIG. 2 illustrates that the device inference and prediction system 102 may obtain some or all of the data contained in the active subscriber datastore 210. For example, at a first time the mobile devices 114, 116, and 118 may register their active location, identifiers, and/or signal strength to the base station 120. The base station 120 may then relay this information to the switching center 203. The switching center 203 may then store this information in the active subscriber datastore 210. At a second time, the device inference and prediction system 102 may query the cellular network in order to obtain the active subscriber information stored in the active subscriber datastore 210. For example, the device inference and prediction system 102 may send a query message (e.g., via the network 128) to the switching center 203 in order to obtain all the active subscribers (mobile identifiers) within a range or signal strength threshold of the base station 120.

As illustrated in FIG. 1, this query message may in some embodiments be in response to the security camera 112 identifying the object of interest 110. In order to transmit a message back to the device inference and prediction system 102, the switching center 203 and/or the base station controller 201 may send a packet of active subscribers 230 to the device inference and prediction system 102 (e.g., via the network 208). The packet of active subscribers 230 may be routed through different network in order to, for example, send the packet over the internet. For example, the packet of active subscribers 230 may be routed (e.g., via the node(s) 213) from the cellular network 128 or base station controller 201 to the network 208. The node 213 may represent one or more routing components, such as a Serving GPRS Support Node (SGSN) and a Gateway GPRS Support Node (GGSN) in a General Packet Radio Service (GPRS) network.

FIG. 3A is a diagram illustrating how an object of interest's mobile device may be inferred based on identifying the object of interest in multiple cell sites, according to embodiments. FIG. 3A includes cell sites 103, 101, 113, 111, 109, 105, and 107. FIG. 3A also includes the object of interest 110, mobile devices 114, 116, and 118, base stations 120, 320, and 322, and security cameras 112, 312, and 314. In some embodiments, the cell sites may be relatively small (e.g., microcells or picocells) such that there are more base stations and/or security cameras for a particular area. This infrastructure may allow for better mobile device inference accuracy (or location prediction estimations) because the more an object of interest moves through more cell sites, the more mobile device inference accuracy and/or estimation accuracy a tracking system will have as explained in more detail below.

FIG. 3A illustrates that in some situations the object of interest 110 may be a person and that person may moving from cell site to cell site (e.g., because he/she is running away), which may make mobile device inference of the object of interest 110 stronger. For example, as illustrated, at a first time the security camera 112 may identify the object of interest 110 (e.g., via pre-stored facial recognition fingerprints). The security camera 112 may then transmit a first set of data to the device inference and prediction system 102 indicating that the object of interest 110 has been identified and a second set of data indicating a first location (e.g., cell site 101) of where the object of interest was identified. The device inference and prediction system 102 may then associate and in response to the receiving of the first set of data and the second set of data, the first location with the base station 120. The device inference and prediction system 102 may then obtain a list of one or more mobile devices that are active within a range of the base station 120 (e.g., via the active subscriber datastore 210 of FIG. 2). Accordingly, and as illustrated, the device inference and prediction system 102 may then determine that mobile devices 114, 116, and 118 are within the active range of the base station 120, without knowing which mobile device belongs to or is associated with the object of interest 110.

The same process that occurred for cell site 101 may then be repeated as the object of interest 110 moves from cell site to cell site—from cell site 107 to 109. Therefore, when the object of interest 110 moves into cell site 107, the security camera 312 may identify the object of interest 110 and the mobile devices that are within an active range of the base station 320 may be obtained. The device inference and prediction system 102 may then determine which mobile device identifiers associated with base station 120 are in common (are shared with/are the same as/are identical to) with the base station 320. As illustrated, mobile devices 116 and 118 are within an active range of the base station 320, which were also within an active range of the base station 120 (i.e., they are in common with each other). The object of interest 110 may yet again move into another cell site—cell site 109. The security camera 314 may then identify the object of interest 110 and the mobile devices that are within an active range of the base station 322 may be obtained. The device inference and prediction system 102 may then determine which device identifiers associated with the base station 120 and/or 320 are in common with the base station 322. As illustrated, the only mobile device that is in common with base stations 101 and 107 is mobile device 116. Accordingly, a strong inference can be made that the object of interest 110 is in possession of or associated with mobile device 116. Therefore, entities, such as law enforcement agencies may then inactivate, track, and/or infiltrate the mobile device 116.

In some embodiments, instead of or in addition to determining which mobile device identifiers associated with a particular base station are in common with another base station, timestamp intervals between identification events may be utilized to infer mobile devices associated with objects of interest. For example, if the security camera 112 identified the object of interest 110 at a first time, and then the security camera 312 identified the object of interest 110 at a second time, the time that has passed between the first and second time (e.g., 5 minutes) may be utilized to filter the mobile devices that handed off from base stations 120 to 320 within/between the first and second time intervals. Accordingly, a snapshot (an identification of) of each active mobile device identifier that was handed off from bases stations 120 to 320 may be take in order to analyze or identify (e.g., by a user) what mobile device identifiers may be associated with the object of interest 110.

Figure 3B:
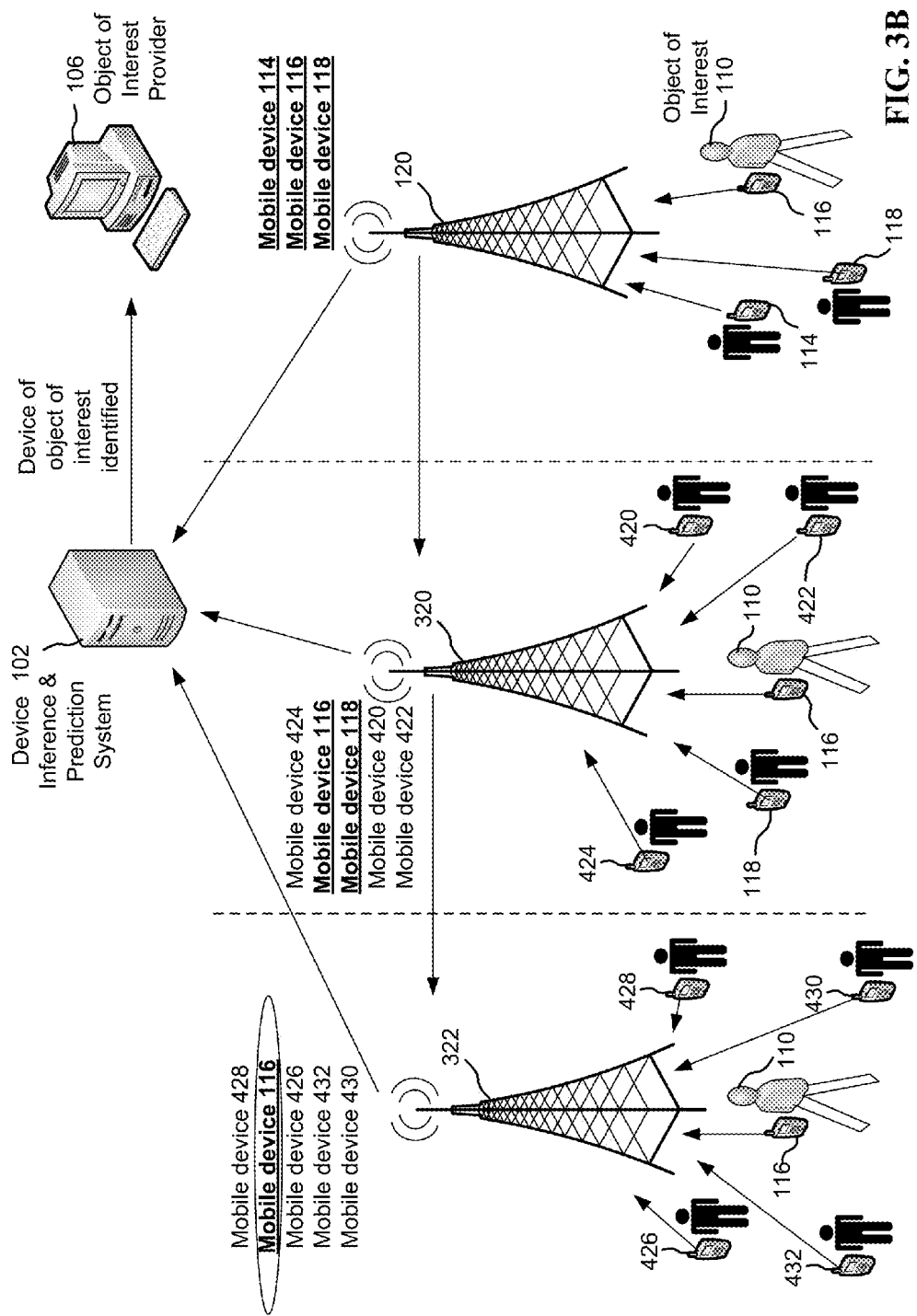
FIG. 3B is a more detailed view of the mobile device inference of the object of interest of FIG. 3A, according to embodiments.

FIG. 3B is a more detailed view of the mobile device inference of the object of interest of FIG. 3A, according to embodiments. Each mobile device—mobile device 114, mobile device 116, and mobile device 118—within an active range of the base station 120 may broadcast or send an active signal to the base station 120 (which is then relayed and stored to the active subscriber datastore 210 as shown in FIG. 2). Each of these mobile devices may be possessed by various people as illustrated. At the first time, when the security camera 112 identifies the object of interest 110, the device inference and prediction system 102 may then obtain (query the cellular network of FIG. 2) each active subscriber or mobile device identifier (e.g., IMSI) from the cellular network associated with base station 120. As illustrated mobile devices 114, 116, and 118 may each be within an active signal strength range of the base station 120.

When the object of interest 110 walks into cell site 107, the security camera 312 may then identify the object of interest 110 and another query may be made to the cellular network associated with the base station 320. Mobile devices 424, 116, 118, 420, and 422 may each register their active location to the cellular network, which is then obtained by the device inference and prediction system 102. The base station 120 may have provided handoff information (e.g., mobile devices 114 and 116) to the base station 320 as a signal strength fell below a threshold for the base station 120 and rose above a threshold for the base station 320. The device inference and prediction system 102 may then determine that the mobile device identifiers associated with base station 120 that are in common with base station 320 are mobile devices 116 and 118.

Further, when the object of interest 110 walks into the cell site 109, the security camera 314 may then identify the object of interest 110 and yet another query may be made to the cellular network associated with the base station 322. Mobile devices 428, 116, 426, 432, and 430 may each register their active location to the cellular network, which is then obtained by the device inference and prediction system 102. The base station 320 may have provided hand-off information (e.g., mobile device 116) to the base station 322 as a signal strength fell below a threshold for the base station 320 and rose above a threshold for the base station 322. The device inference and prediction system 102 may then determine that the only mobile device identifier that was originally associated or registered with base station 120 and/or 320 that are in common with the base station 322 is mobile device 116. Accordingly, the device inference and prediction system 102 may then infer that the object of interest 110 is possessing the mobile device 116. In some embodiments, after the device inference and prediction system 102 infers the mobile device 116 it may then notify or alert the object of interest provider 106, which may correspond to a law enforcement agency computing device. In some embodiments, the notification may include various data, such as the mobile device identifier (mobile telephone number) of the object of interest, the identity of the object of interest, the general location of the object of interest 110 (e.g., somewhere within cell site 109), the exact location of the object of interest 110 (e.g., via triangulation methods), a location and/or route estimate of the object of interest 110, etc. Each of these notification data are described in more detail below. In some embodiments, the operations described in FIGS. 3A and 3B may instead be performed by computing devices that include security cameras.

Figure 4A:
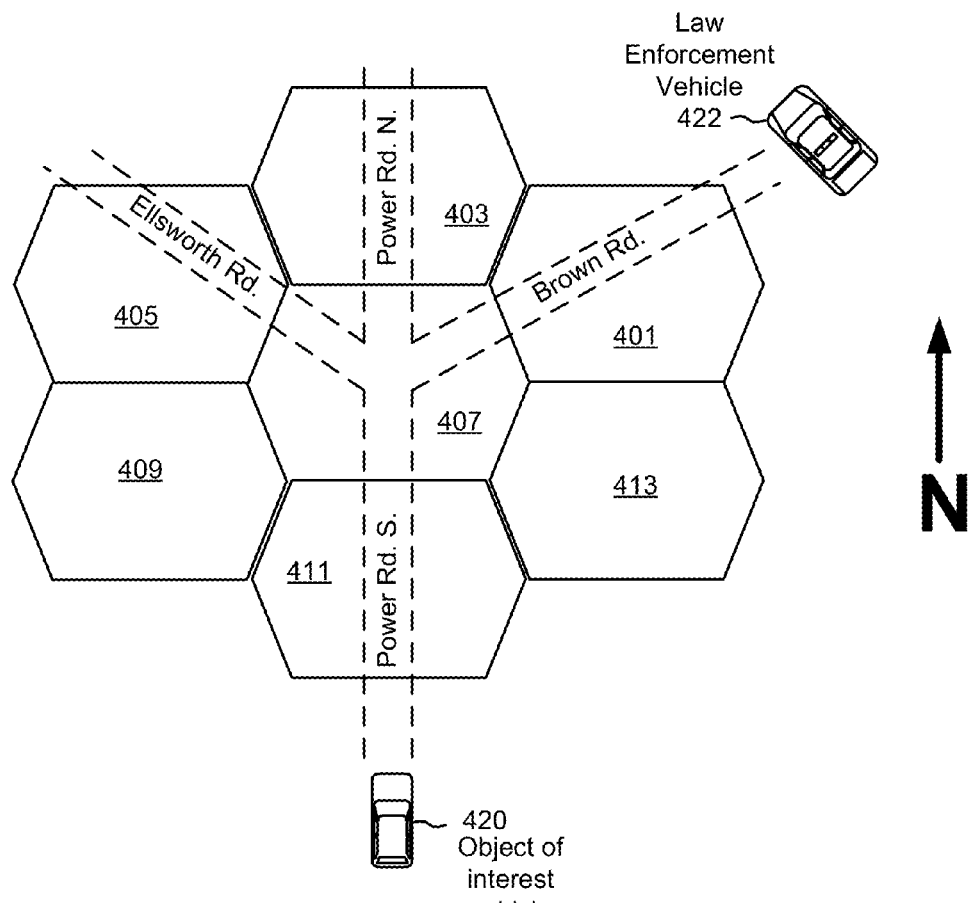
FIG. 4A is a diagram illustrating how an object of interest location prediction and/or route may be estimated, according to embodiments.

FIG. 4A is a diagram illustrating how an object of interest location prediction and/or route may be estimated, according to embodiments. FIG. 4A includes cell sites 403, 401, 413, 411, 409, 405, and 407. There are also streets that cross through or over these cell sites—Power Rd. S. starts from cell site 411 and goes through cell site 407 and becomes Power Rd. N. in cell site 403. Two streets fork off Power Rd. at cell site 407—Brown Rd. forks off from Power Rd. starting from cell site 407 and goes into cell site 401. And Ellsworth Rd. also forks off from Power Rd. starting from cell site 407 and goes into cell site 405. The object of interest may be a license plate identifier that is coupled to the object of interest vehicle 420. The object of interest vehicle 420 may be identified to be starting in a position south of cell site 411 and heading in a northern direction on Power Rd. S. As described in more detail below, a system associated with the law enforcement vehicle (e.g., device inference and prediction system 102 and/or the object of interest information provider 106) may have provided information to an occupant of the law enforcement vehicle 422 indicating that the object of interest vehicle 420 will most likely keep travelling north on Power Rd. S. and take a right on Brown Rd., instead of a left on Ellsworth Rd. or north on Power Rd. N. Accordingly, the law enforcement vehicle 422 may be oriented in a blocking or stopping position outside of cell 401 at Brown Rd. so as to provide a major road block, and/or be in position to utilize any other halting methods such as placing spike strips on the street to stop the object of interest vehicle 420.

The object of interest license plate number or identifier may first be located by a security camera south of cell site 411. The license plate number may correspond to a stolen vehicle, vehicle of a person of interest, etc. In some embodiments, a specific location estimate may be generated (e.g., by the device inference and prediction system 102) after the object of interest and/or a mobile device of the object of interest has been identified and associated with a particular location and base station or cell site. For example, after a mobile device of an object of interest has been identified or inferred (e.g. via the methods described in FIGS. 3A and 3B), the tracking system may infiltrate the mobile device and obtain Global Positioning Systems (GPS) data such that coordinates of where the mobile device is located (which may be in possession by a person in the object of interest vehicle 420) may be obtained. Alternatively, once the mobile device is inferred the mobile identifier may be blacklisted and EIR data (e.g., IMEIs) may be obtained in order to monitor or track the inferred mobile device IMEI such that a particular position of the object of interest may be inferred.

In some embodiments cell tower triangulation methods may be utilized to infer a particular position of a mobile device associated with an object of interest. This is based on the principle that multiple base stations may receive signals from a particular mobile device regardless of what cell site the mobile device is in. And based on a signal strength connection between particular base stations and the mobile device and the base station sectors that receive the signals, a particular location can be inferred. For example, there may be three base stations that are picking up a signal from a mobile device and each base station may have three triangular sectors (i.e., Alpha, Beta, and Gamma sectors) that receive signals associated with a particular orientation range (e.g., Northeast). The Gamma sector of a first base station may be picking up a signal at a particular signal strength value (or may be picking up a time delay value a signal takes to return to the Gamma sector). This may correspond to a distance between the mobile device and the first base station. A Beta sector of a second base station may be picking up a signal at a particular signal strength value for the same mobile device. Further, an Alpha sector of a third base station may be picking up a signal at a particular signal strength value for the same mobile device. Each of these signal strength value readings, sector orientations, and distance inferences may be consolidated in order to pinpoint a location of a mobile device (which an object of interest may be in possession of).

In some embodiments, once an object of interest and/or inferred mobile device has been located (e.g., via GPS coordinates or by cell tower triangulation), various other information may be obtained (e.g., GPS data) that specifies what geographical features (e.g., Power Rd. S., Brown Rd., Power Rd. N., Ellsworth Rd., etc.) surround the object of interest and/or inferred mobile device. Other data (e.g., speed of the object of interest, the direction of travel of the object of interest, etc.) may also be obtained (e.g., by a radar within a security camera or an infrared range finder, etc.) in order to generate a location prediction estimate of where the object of interest will move at a future time, as described in more detail below.

Figure 4B:
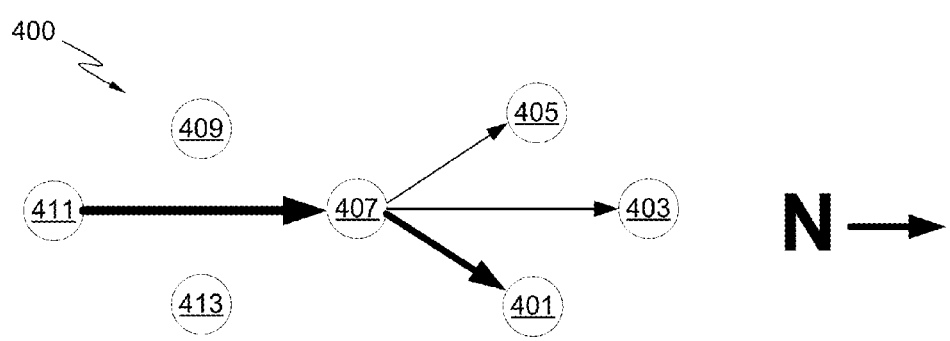
FIG. 4B is a diagram illustrating in more detail how the location prediction and/or route the object of interest in FIG. 4A may be estimated, according to embodiments.

FIG. 4B is a diagram illustrating in more detail how a location prediction and/or rout the object of interest in FIG. 4A may be estimated, according to embodiments. As disclosed herein a "location prediction estimation" may be an estimated calculation of where (e.g., specific GPS coordinates, base station location, triangulated position, etc.) an object of interest will move to or arrive at a future time given a particular set of data (e.g., the starting point, direction of travel, the road an object of interest is on, etc.). A "route estimation" as disclosed herein may refer to a route (streets driven on, direction traveled, etc.) that an object of interest will take in the midst of travelling to a particular destination. The location prediction or route estimation may be made in any suitable manner using various data mining techniques, such as hidden Markov models, Kalman filters, or any other method.

For example, the location prediction estimation and/or route estimation may be calculated using a Dynamic Bayesian Network (DBN), as illustrated by the graph 400. The graph 400 includes various nodes—411, 409, 413, 407, 405, 403, and 401—that directly correspond to the cell cites 411, 409, 413, 407, 405, 403, and 401 of FIG. 4A. DBNs utilize probability theory to predict an outcome and is premised on the paradigm that an environment can be viewed as a series of snapshots or time slices (t). DBN assumes that a same subset of variables is observable in each time slice. The variables (Xt) denote the set of variables (i.e., nodes 411, 409, 413, 407, 405, 403, or 401) at time t, which may be assumed to be unobservable. The variables $e_t$ (or $E_t$) denote a set of observable evidence variables (e.g., security camera identification matches in each cell site), which may include multiple types of evidence variables (e.g., vehicle speed, traffic data, road layout, etc.), as described in more detail below.

In a DBN, the location prediction estimation and/or route estimation may be calculated by inference techniques such as filtering and prediction. "Filtering" is associated with the principle of computing a "belief state"—the posterior distribution over a most recent state given all the evidence to date. "Prediction" is the principle of computing the posterior distribution over a future state, given all of the evidence to date. Filtering and prediction in the context of FIGS. 4A and 4B may be represented as follows: $P(X_{(t+k)}|e_{(1:t)})$, where k>0 and is the quantity of steps predicted into the future, and where P is the probability. Thus, the device inference and prediction system 102 or other component may compute, for example, the probability that the object of interest vehicle 420 will arrive in cell site 405 in 5 minutes compared to other cell sites, given all of the evidence observations. Prediction is therefore useful for evaluation possible courses of action based on their expected outcomes.

The location prediction estimation and/or route estimation may further be estimated through a "most likely explanation" model in addition to or instead of the filtering and prediction methods described above. These models provide that given a sequence of observations, it may be desirable to find the sequence of states that is most likely to have generated one or more of the observations. This may be represented by computing:

$$\mathrm{argmax}_{(x_{(1:t)})} P(X_{(1:t)}|e_{(1:t)}).$$

These calculations may be utilized to, for example, explain why the object of interest license plate attached to the object of interest vehicle 420 was identified in some cell sites but not others. For example, if it was observed that the object of interest vehicle 420 was identified going north on Power Rd. S. through the cell sites 411 and 407 at slow speeds (e.g., 30 MPH), but then accelerated to a fast speed (e.g., 90 MPH) at the northern end of cell site 407, and was beginning to veer right from cell cite 407 onto Brown Rd., yet was not identified in cell site 401, then a most likely explanation may be that the object of interest vehicle 420 was travelling too fast to be identified within cell site 401. And if this occurs, in some embodiments, the device inference and prediction system 102 or other component may still generate location prediction estimations and/or route estimations, particularly where the system is making these "most likely explanation" inferences. Thus an object of interest does not necessarily need to be identified in every cell site it enters to make inferences.

Because DBNs may assume the probability of future conditionally independent events $P(X_t|X_{(0:\ t-1)})=P(X_t|X_{(t-0)})$, it can also be considered that after identifying an object of interest on $G_t$, the inferring of $P(A_T|G_T)$, $P(F_T|G_T)$ and $P(E_T|G_T)$ would not depend on $C_t$, $B_t$, or $D_t$, where G=node 407, A=node 405, F=node 403, E=node 401, C=node 411, B=node 409, and D=node 413. This may narrow down considerably the possibilities of where the object of interest vehicle 420 will go. For example, given that the object of interest vehicle 420 is travelling north on Power Rd. S., and is approaching cell site 411, and there is only the road configuration available as illustrated, it must follow that the object of interest must either take a left at Ellsworth, keep going straight on Power Rd. N., or take a right at Brown Rd. Given these three possibilities, the system can make even more inferences within this three-choice pool, as described in more detail below. Accordingly, instead of predicting that the object of interest vehicle 420 has a 33.33 percent chance (an equal chance) of taking one of these three destinations, more calculations may be done to further generate a location prediction estimate and/or route estimate.

FIGS. 4B (and 4A) illustrates how a location prediction estimate and/or route estimate predicts that the object of interest vehicle 420 will keep travelling north through cell sites 411 and 407 and then through cell site 401. The graph 400 illustrates a relationship between any two variables denoted by an arrow connecting one node with another node. The "strength" of the relationship may be denoted by the thickness of the arrow connecting the nodes. The graph 400 illustrates that the strongest relationship is between nodes 411 and 407. The graph 400 also illustrates that there is no relationship between any node and nodes 409 or 413. Accordingly, for example, given that the object of interest vehicle 420 is within the cell site 411, there is a strong probability (e.g., 95%) that the object of interest vehicle will travel north into cell site 407 and not deviate into cell sites 409 or 413. This strong prediction may be made by making particular observations and compounding various evidence variables. For example, observations may be made (e.g., by a security camera and/or device inference and prediction system 102) that the object of interest vehicle 420 is currently heading north at 50 miles per hour, that there is only one major road that connects cell site 411 to 407 (i.e., Power Rd. S.), that the object of interest has been spotted in the past heading to cell site 407 via Power Rd. S. (instead of taking side residential roads), etc.

FIGS. 4B (and 4A) also illustrates that there is varying relationships between node 407 and node 405 (the weakest relationship), node 407 and node 403, and node 407 and node 401 (a stronger relationship than nodes 407 and 405). Accordingly, when the object of interest vehicle 420 is travelling north and is in cell site 407, it may: travel northwest (via Ellsworth Rd.) into cell site 405, travel north (via Power Rd. N.) into cell site 403, or travel northeast (via Brown Rd.) into cell site 401.

Even though theoretically the object of interest 420 may take any of these three roads, various data may be obtained in order to infer which route/destination the object of interest vehicle 420 will likely take. Such data may include one or more of: traffic data, traffic light data (e.g., whether a traffic light on a particular street is or will turn red), speed limit(s) posted on particular street(s), directions of location interest (s) associated with the object of interest (e.g., an address of the object of interest), real time data provided by a mobile device associated with the object of interest (e.g., text messages, phone calls, etc.), a history of where an object of interest has been, etc. In some embodiments, these data may weighted or scored differently in order to rank or prioritize the importance of data. For example, real time data may be scored higher or be weighted more than any other data because it may reflect an interest or intent of a person associated with the object of interest 420 at a particular moment in time.

In an example illustration, the object of interest vehicle 420 may have a 60% chance of taking a right on Brown Rd. and thus going through cell site 401 (node 401) instead of a 30% chance of going straight on Power Rd. N. and a 10% chance of going left at Ellsworth because of various data. For example, the traffic data (e.g., obtained by the device inference and prediction system 102 and/or security camera) may indicate that Brown Rd. has the least amount of traffic (e.g., a least quantity of cars that have passed over a given point (a point where a security camera is) for a particular duration of time). A location interest, such as a home address, associated with a person driving the object of interest 420 may be off of Brown Rd. or be at cell site 401. This location interest may be obtained in various manners. For example, a mobile phone identifier associated with an object of interest may be inferred (e.g., via methods analogous to FIG. 3B). After inference, a system (e.g., the device inference and prediction system 102 and/or the object of interest information provider 106) may query a registration provider or network associated with the mobile device in order to get a home address. For example, referring back to FIG. 2, in some embodiments, subscriber datastores may also include a home address associated with each user or mobile device. Accordingly, if the device inference and prediction system 102 queried the cellular network, the active subscriber datastore 210 may include a home address, which may then be forwarded to the device inference and prediction system 102, the security camera 112, and/or the object of interest information provider 106. Alternatively, an object of interest may be a person's face. The corresponding facial digital fingerprint may be stored and associated with a particular person of interest's home address (e.g., via the object of interest information provide 106).

In some embodiments, real time data may indicate that the object of interest vehicle 420 will go down Brown Rd. instead of any other road. For example, if the mobile device associated with the object of interest was inferred, the mobile phone may be infiltrated to obtain data. Accordingly, for example, an object of interest associated with the mobile phone may text or call another person indicating that he/she is currently on her way to a location, which may be at or associated with cell site 401. And this data may be accessed (e.g., by the device inference and prediction system 102) and utilized as a factor to generate a location prediction estimation and/or route estimation.

In some embodiments, historical data indicating where an object of interest has been identified in the past may be utilized to generate a location prediction estimation and/or route estimation. For example, the object of interest vehicle 420 may have been identified two weeks ago and four weeks ago heading northeast on Brown Rd. around the intersection of Power Rd and may not have historically been identified taking Ellsworth Rd. or Power Rd. N. It may therefore be inferred that the object of interest will once again travel down Brown Rd. In some embodiments, this historical data may also or instead be utilized to infer a mobile device identifier. For example, using the illustration above, a mobile device identifier for a particular cell site(s) that was in common with the two week identification, the four week identification, and the current identification, may be inferred to be associated with an object of interest. Therefore, for each reason stated above, node 407 may indicate a strong relationship with node 401 thereby providing enough data such that the law enforcement vehicle 422 may be located outside of cell site 401 in order to capture or stop the object of interest vehicle 420.

Figure 5:
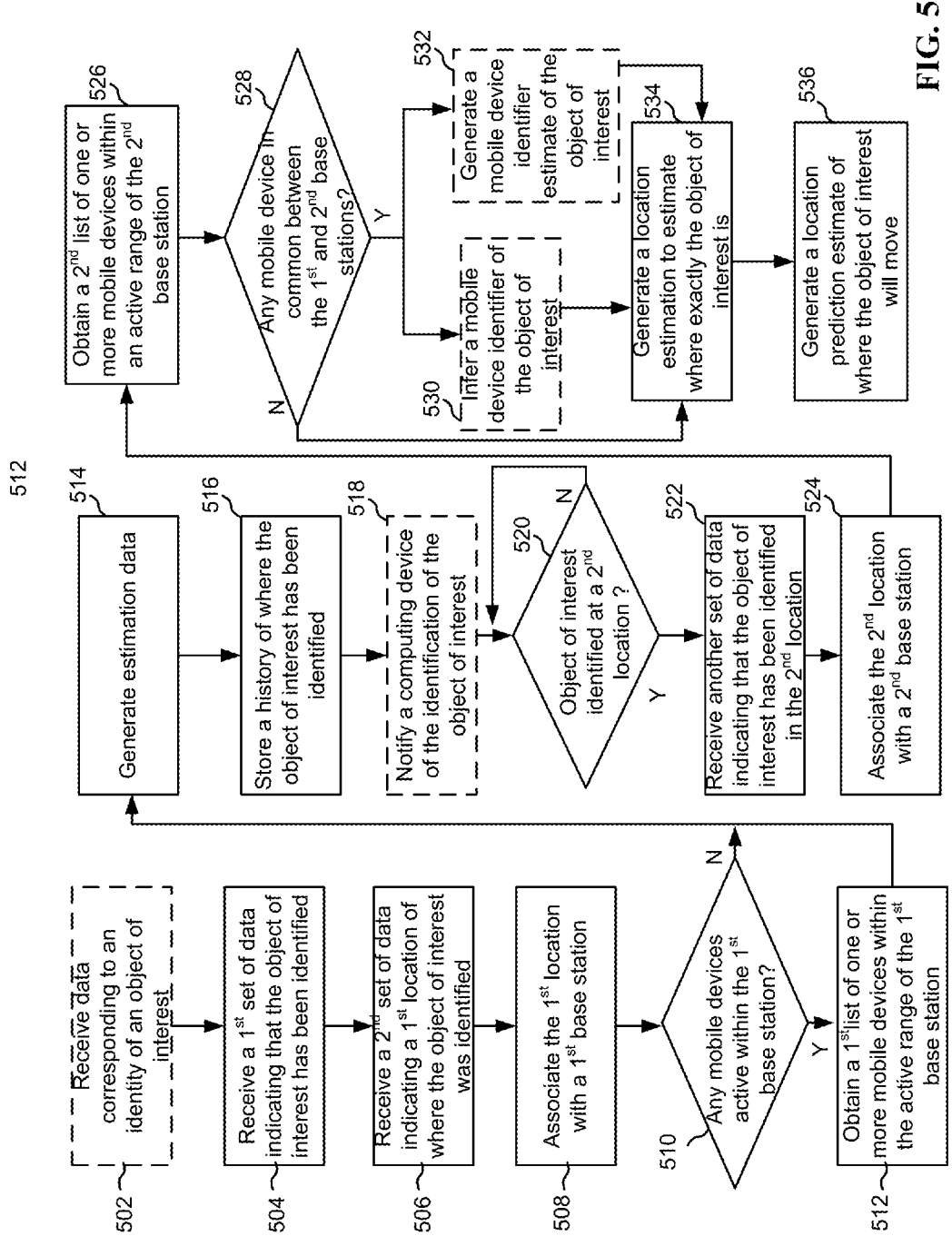
FIG. 5 is a flow diagram of an example process for inferring a mobile device identifier associated with an object of interest and generating a location prediction estimation or route estimation of an object of interest, according to embodiments.

FIG. 5 is a flow diagram of an example process for inferring a mobile device identifier associated with an object of interest and generating a location prediction estimation or route estimation of an object of interest, according to embodiments. In some embodiments, the example process may begin at block 502 when data is received (e.g., by the device inference and prediction system 102 and/or the security camera 112) corresponding to an identity of an object of interest. For example, a security camera system may receive a digital fingerprint associated with an object of interest's facial identity from the object of interest information provider 106.

Per block 504, a first set of data may be received (e.g., by the device inference and prediction system 102 and/or the security camera 112) indicating that the object of interest has been identified. For example, a security camera system may match the digital fingerprint data received at block 502 to an object of interest and transmit the first set of data to the device inference and prediction system 102. Per block 506, a second set of data may be received indicating a first location of where the object of interest was identified. The first location may correspond to a geographical area. For example, a security camera may have matched a digital fingerprint with an object of interest along with a location identifier indicating where the matching occurred.

Per block 508, the first location may be associated with a first base station (e.g., by the security camera 112 and/or the device inference and prediction system 102). This may be in response to the receiving of the first set of data and the second set of data. For example, the datastore 104 of FIG. 1 may include a record that specifies the location that it was provided by the security camera and the corresponding base station ID. Per block 510, it may be determined whether any mobile devices are active within the first base station range (e.g., a signal strength threshold). If no mobile devices are active within the first base station, a counter may be set (e.g., for 2 minutes) to continually poll a cellular network to determine whether any mobile devices become active. If no mobile device are still found to be active, then block 514 may occur. Per block 512, if one or more mobile devise are active within the first base station range, then a first list of one or more mobile devices within the active range of the first base station may be obtained (e.g., by the security camera 112 and/or the device inference and prediction system 102). This may be in response to the associating at block 508. The "list" of mobile devices may include mobile device identifiers (e.g., telephone numbers) of the mobile devices that are active.

Per block 514 various estimation data may be generated (e.g., by the security camera 112 and/or the device inference and prediction system 102). For example, one or more components may: generate a location estimation to estimate where exactly the object of interest is (e.g., via cell tower triangulation, GPS coordinates, etc.), infer a mobile device identifier of the object of interest or generate a mobile device identifier estimate of the object of interest, generate a location prediction estimation/route estimation of where the object of interest will go. In some embodiments, a time estimate of how fast the object of interest will arrive at a particular location may be generated as well. For example, the security camera 112 may include a speed radar module configured to estimate a velocity of an object of interest and based on the velocity and the direction of the velocity, the time estimate of where the object of interest will go may be generated. The time estimate may also be included in the operations specified in block 536.

Per block 516, a history of where the object of interest has been identified may be stored (e.g., to the security camera 112, the object of interest information provider 106 and/or the device inference and prediction system 102). This information may be utilized to generate a location prediction estimation or route estimation of an object of interest at a later time. For example, if the object of interest was spotted several times going from area 1 to area 2, this may be stored data. The next time the object of interest is identified in area 1, it may be predicted that the object of interest will go into area 2. This historical data may be utilized for "machine learning" in intelligent systems. Machine learning is the ability learn or recognize patterns without receiving explicit user input.

Per block 518, a computing device (e.g., the object of interest information provider 106 and/or the device inference and prediction system 102) may be notified that the object of interest has been identified. For example, after a security camera identifies a particular object of interest, the security camera may notify the object of interest information provider 106 corresponding to law enforcement. This notification may include various sets of information, such as what and where the object of interest was located, a location prediction estimation, mobile device identifier inferences, etc.

Per block 520, it may be determined whether the object of interest was identified at a second location. Per block 522, if the object of interest was identified at the second location then another set of data may be received indicating that the object of interest has been identified at the second location. Per block 524, the second location may be associated with a second base station. Per block 526, a second list of one or more mobile devices within an active range of the second base station may be obtained.

Per block 528, it may be determined (e.g., by the device inference and prediction system 102 and/or the security camera 112) whether any mobile devices are in common (e.g., the same as) between the first and second base stations (e.g., via the operations specified in FIG. 3B). Per block 530, if there are any mobile devices in common between the first and second base stations then a mobile device identifier associated with the object of interest (a mobile device in possession of the object of interest) may be inferred based on the determining which mobile device identifiers generated by the first base station are in common with the second base station. And based on the receiving the set (the third set) of data at block 522. For example, referring back to FIG. 3B, if only one mobile device identifier—mobile device 116—was found to be in common with those identified around the base station 120, then it may be inferred that mobile device 116 is associated with an object of interest. Alternatively, per block 532, a mobile device identifier estimate of the object of interest may be generated. For example, referring back to FIG. 3B, if by the time the object of interest arrived at the base station 322 and both mobile devices 116 and 118 were both identified in cell site 109, then it may be estimated that either the mobile devices 116 or 118 may belong to the object of interest 110, as these two mobile device identifiers were the only common identifiers identified at cell site 101.

Per block 534, a location estimation to estimate where exactly the object of interest is may be generated (e.g., by the security camera 112, the object of interest provider 106, and/or the object of interest information provider 106). For example, as described above, the exact (or near exact) location may be generated via GPS coordinates, cell tower triangulation, etc. Per block 536, a location prediction estimate may be generated (e.g., by the device inference and prediction system 102, the security camera 112, and/or the object of interest information provider) of where the object of interest will move at a future time may be made. As discussed above, this estimation may be generated using various data such as traffic data, handoff data, history of where the object of interest has been identified, etc.

Figure 6:
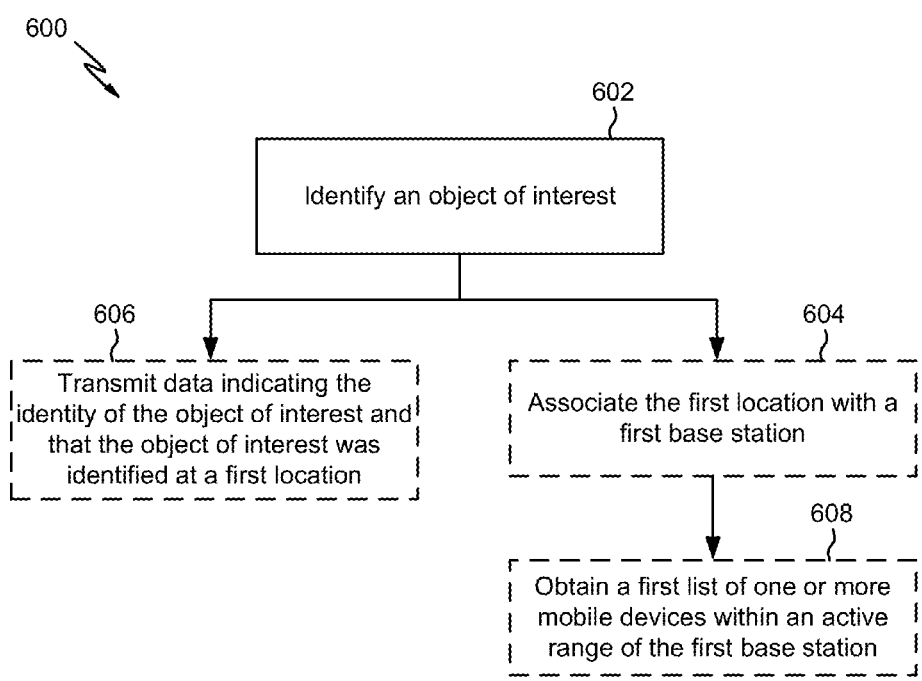
FIG. 6 is a flow diagram of an example process illustrating how a tracking system identifies an object of interest, according to embodiments.

FIG. 6 is a flow diagram of an example process 600 illustrating how a tracking system identifies an object of interest, according to embodiments. The process 600 may begin at block 602 when a device (e.g., a surveillance system or security camera) identifies an object of interest. The identification may occur in any suitable manner according to various embodiments. For example, the security camera 112 may be a computing device that stores various object of interest fingerprints. These fingerprints may include digital patterns that directly correspond to a person of interest's facial pattern or other objects. For example, these fingerprints may be or include a computer-aided design (CAD) that may be a graphical representation of an object of interest. The security camera 112 may continuously monitor or scan its environment in order to potentially match the fingerprints to an object of interest. The matching or visual identification may occur in any suitable manner. For example, the security camera 112 may continuously run computer vision tracking or object recognition algorithms such as Principal Component Analysis (PCA), Hidden Markov Model, dynamic link matching, etc. in order to identify an object of interest.

In some embodiments, the identification of the object of interest at block 602 may occur via microphone instead of or in addition to security cameras. For example, the security camera 112 may include a microphone configured to pick up voice patterns of objects or people. The security camera 112 may include a speech recognition or natural language processing (NLP) module configured to identify words or sentences a person is saying based on a sound input (e.g., processed by a "most likely explanation" algorithm described above for DBN networks) of that person. In an example illustration, the security camera may store coined phrases or voice fingerprints associated with an object of interest. For example, an object of interest may always say a particular unique phrase. That unique phrase may be stored to the security such that any time the security camera identifies the particular phrase (e.g., via NLP and a microphone), the object of interest may be identified. In other examples, the object of interest's voice itself regardless of the content may be identified via voice matching algorithms (e.g., via Mel Frequency Cepstral Coefficient (MFCC) and/or Dynamic Time Warping (DTW) algorithms).

In some embodiments, the object of interest may already be known (e.g., by law enforcement officers) before the object of interest is identified by a tracking system. For example, particular objects of interest may be missing or wanted for a crime. Accordingly, the object of interest information provider 106, for example, may upload object of interest fingerprints to the security camera 112 so that the security camera 112 knows what to identify. Alternatively, objects of interest may not be known by entities but may be dynamically identified based on one or more real time input data that the tracking system receives from an object. For example, the security camera 112 may identify (e.g., via NLP and a microphone) particular words or sentences that are associated with particular crimes. For example, a NLP module and microphone may identify a string of words "I'm going to rob the store tonight," and associate this string with an actionable response such as notifying the object of interest information provider 106 and/or the device inference and prediction system 102. The person saying this phrase could then become an object of interest. The security camera 112 could then, for example, take a snapshot digital picture of the object of interest and store (or transmit) such information in order to track such individual through various cell sites, as described above.

Per block 606, and in some embodiments, data may be transmitted indicating the identity of the object of interest and that the object of interest was identified at a first location. For example, the security camera 112 may capture image information of the object of interest to identify the object of interest and then transmit a location identifier and identity of the object of interest to the device inference and prediction system 102. In other embodiments however, per block 604 the first location may be associated with a first base station. And per block 608, a first list of one or more mobile device within an active range of the first base station may be obtained. Accordingly, the security camera 112, for example may be the component (e.g., instead of or in addition to the device inference and prediction system 102) that does the associating or the obtaining of lists.

Figure 7:
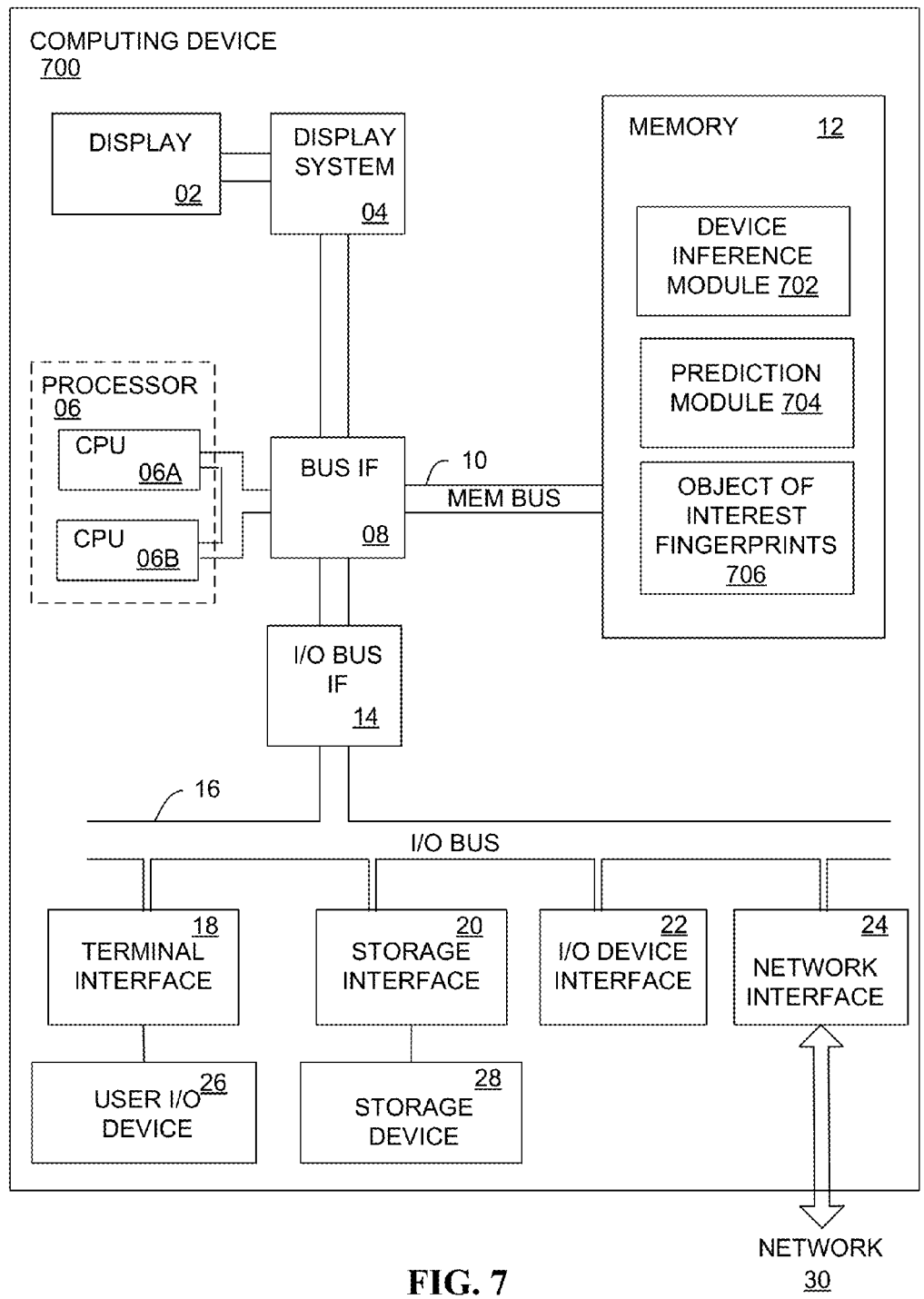
FIG. 7 is a block diagram of a computing device that includes a device inference module and a prediction module, according to embodiments.

FIG. 7 is a block diagram of a computing device 700 that includes a device inference module 702, a prediction module 704, and object of interest fingerprints 706, according to embodiments. In some embodiments, the computing device 700 represents the device inference and prediction system 102, the security camera 112, and/or the object of interest information provider 106. The components of the computing device 700 can include one or more processors 06, a memory 12, a terminal interface 18, a storage interface 20, an Input/Output ("I/O") device interface 22, and a network interface 24, all of which are communicatively coupled, directly or indirectly, for inter-component communication via a memory bus 10, an I/O bus 16, bus interface unit ("IF") 08, and an I/O bus interface unit 14.

The computing device 700 may include one or more general-purpose programmable central processing units (CPUs) 06A and 06B, herein generically referred to as the processor 06. In an embodiment, the computing device 700 may contain multiple processors; however, in another embodiment, the computing device 700 may alternatively be a single CPU device. Each processor 06 executes instructions stored in the memory 12 (e.g., the device inference module 702).

The computing device 700 may include a bus interface unit 08 to handle communications among the processor 06, the memory 12, the display system 04, and the I/O bus interface unit 14. The I/O bus interface unit 14 may be coupled with the I/O bus 16 for transferring data to and from the various I/O units. The I/O bus interface unit 14 may communicate with multiple I/O interface units 18, 20, 22, and 24, which are also known as I/O processors (IOPs) or I/O adapters (IOAs), through the I/O bus 16. The display system 04 may include a display controller, a display memory, or both. The display controller may provide video, audio, or both types of data to a display device 02. The display memory may be a dedicated memory for buffering video data. The display system 04 may be coupled with a display device 02, such as a standalone display screen, computer monitor, television, a tablet or handheld device display, or another other displayable device. In an embodiment, the display device 02 may include one or more speakers for rendering audio. Alternatively, one or more speakers for rendering audio may be coupled with an I/O interface unit.

In alternate embodiments, one or more functions provided by the display system 04 may be on board an integrated circuit that also includes the processor 06. In addition, one or more of the functions provided by the bus interface unit 08 may be on board an integrated circuit that also includes the processor 06.

The I/O interface units support communication with a variety of storage and I/O devices. For example, the terminal interface unit 18 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 26 and the computing device 700, may receive output data via the user output devices. For example, a user interface may be presented via the user I/O device 26, such as displayed on a display device, played via a speaker, or printed via a printer.

The storage interface 20 supports the attachment of one or more disk drives or direct access storage devices 28 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 28 may be implemented via any type of secondary storage device. The contents of the memory 12, or any portion thereof, may be stored to and retrieved from the storage device 28 as needed. The storage devices 28 may be employed to store any of the databases or data store data described herein. The I/O device interface 22 provides an interface to any of various other I/O devices or devices of other types, such as printers or fax machines. The network interface 24 provides one or more communication paths from the computing device 700 to other digital devices and computer systems.

Although the computing device 700 shown in FIG. 7 illustrates a particular bus structure providing a direct communication path among the processors 06, the memory 12, the bus interface 08, the display system 04, and the I/O bus interface unit 14, in alternative embodiments the computing device 700 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 14 and the I/O bus 08 are shown as single respective units, the computing device 700, may include multiple I/O bus interface units 14 and/or multiple I/O buses 16. While multiple I/O interface units are shown, which separate the I/O bus 16 from various communication paths running to the various I/O devices, in other embodiments, some or all of the I/O devices are connected directly to one or more system I/O buses.

In various embodiments, the computing device 700 is a multi-user mainframe computer system, a single-user system, or a server computer or similar device that has little or no direct user interface, but receives requests from other computer systems (clients). In other embodiments, the computing device 700 may be implemented as a desktop computer, portable computer, laptop or notebook computer, tablet computer, pocket computer, telephone, smart phone, smart watch, or any other suitable type of electronic device.

In an embodiment, the memory 12 may include a random-access semiconductor memory, storage device, or storage medium (either volatile or non-volatile) for storing or encoding data and programs. In another embodiment, the memory 12 represents the entire virtual memory of the computing device 700, and may also include the virtual memory of other computer systems coupled to the computing device 700 or connected via a network 30. The memory 12 may be a single monolithic entity, but in other embodiments the memory 12 may include a hierarchy of caches and other memory devices. For example, memory may exist in multiple levels of caches, and these caches may be further divided by function, so that one cache holds instructions while another holds non-instruction data, which is used by the processor. Memory 12 may be further distributed and associated with different CPUs or sets of CPUs, as is known in any various so-called non-uniform memory access (NUMA) computer architectures.

The memory 12 may store all or a portion of the components and data (e.g., the device inference module 702) shown in FIG. 7. These programs and data are illustrated in FIG. 7 as being included within the memory 12 in the computing device 700; however, in other embodiments, some or all of them may be on different computer systems and may be accessed remotely, e.g., via a network 30. The computing device 700 may use virtual addressing mechanisms that allow the programs of the computing device 700 to behave as if they only have access to a large, single storage entity instead of access to multiple, smaller storage entities. Thus, while the components and data shown in FIG. 7 are illustrated as being included within the memory 12, these components and data are not necessarily all completely contained in the same storage device at the same time. Although the components and data shown in FIG. 7 are illustrated as being separate entities, in other embodiments some of them, portions of some of them, or all of them may be packaged together.

In an embodiment, the components and data shown in the memory 12 of FIG. 7 (the device inference module 702, the prediction module 704, and/or the object of interest fingerprints 702) may include instructions or statements that are executable/readable on the processor 06 or instructions or statements that are interpreted by instructions or statements that execute/read on the processor 06 to carry out the functions as described above. In another embodiment, the components shown in FIG. 7 may be implemented in hardware via semiconductor devices, chips, logical gates, circuits, circuit cards, and/or other physical hardware devices in lieu of, or in addition to, a processor-based system. In an embodiment, the components shown in FIG. 5 may include data in addition to instructions or statements.

In some embodiments, the device inference module 702 is configured to infer a mobile device or generate a mobile device estimate of an object of interest. The device inference module 702 may be further configured to perform some or each of the operations and/or block functions as specified in FIGS. 1, 2, 3A, 3B, 4A, 4B, 5, and/or 6. In some embodiments, the prediction module 704 may be configured to generate a location prediction estimate of where the object of interest is and/or will be. The prediction module 704 may be further configured to perform some or each of the operations and/or block functions as specified in FIGS. 1, 2, 3A, 3B, 4A, 4B, 5, and/or 6. The object of interest fingerprints 706 may be digital pictures/fingerprints that correspond and are used to identify an object of interest. The object of interest fingerprints 706 may in addition or instead be stored to the storage device 28 (e.g., a database). In some embodiments, the device inference module 702, the prediction module 704, and/or the object of interest fingerprints 706 may be combined to form a single module instead of separate modules. This single module may perform each of the operations and/or blocks as specified in each figure.

FIG. 7 is intended to depict representative components of the computing device 700. Individual components, however, may have greater complexity than represented in FIG. 7. In FIG. 7, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 7 may be implemented, in various embodiments, in a number of different ways, including using various computer applications, routines, components, programs, objects, modules, data pages etc., which may be referred to herein as "software," "computer programs," or simply "programs."

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by a computing device, a first set of data indicating that an object of interest has been identified;
receiving, by the computing device, a second set of data indicating a first location of where the object of interest was identified, the first location corresponding to a geographical area;
associating, by the computing device and in response to the receiving of the first set of data and the second set of data, the first location with a first transceiver base station;
obtaining, by the computing device and in response to the associating, a first list of one or more mobile devices that are within an active range of the first transceiver base station;
receiving a third set of data indicating that the object of interest was identified at a second location;
associating, by the computing device and in response to the receiving of the third set of data, the second location with a second transceiver base station;
obtaining, by the computing device and in response to the associating the second location with a second transceiver base station, a second list of one or more mobile devices within an active range of the second base transceiver station; and
determining which mobile device identifiers associated with the first transceiver base station are in common with the mobile device identifiers associated with the second transceiver base station, wherein the mobile device identifiers correspond to the first list and the second list of one or more mobile devices.

2. The method of claim 1, further comprising inferring a first mobile device identifier associated with the object of interest based on the determining which mobile device identifiers generated by the first transceiver base station are in common with the mobile device identifiers associated with the second transceiver base station and based on the receiving of the third set of data.

3. The method of claim 1, further comprising generating a location prediction estimate of where the object of interest will move at a future time base on at least the identifying of the object of interest at the first location and at the second location.

4. The method of claim 1, further comprising generating a location prediction estimate of where the object of interest will move at a future time based on at least one of the following factors: a history of where the object of interest has been identified, a speed limit, real time data provided by a mobile device associated with the object of interest, a location interest associated with the object of interest, a geographical layout of the first location, and traffic data.

5. The method of claim 1, wherein the object of interest is a person's facial features and wherein a security camera identifies the person's facial features via an object recognition algorithm and responsively transmits the first set of data to the computing device.

6. The method of claim 1, wherein the object of interest is a person's voice and wherein a system that includes a microphone and a natural language processing module identifies the person's voice and responsively transmits the first set of data to the computing device.

7. A system comprising:
a computing device having a processor; and
a computer readable storage medium having program instructions embodied therewith, the program instructions readable/executable by the processor to cause the system to perform a method, the method comprising:
receiving, at a first time, a first set of data indicating that an object of interest has been identified;
receiving a second set of data indicating a first location of where the object of interest was identified, the first location corresponding to a geographical area;
associating, in response to the receiving of the first set of data and the second set of data, the first location with a first transceiver base station;
obtaining, in response to the associating, a first list of one or more mobile devices that are within an active range of the first transceiver base station;
receiving, at a second time, a third set of data indicating that the object of interest was identified at a second location;
associating, in response to the receiving of the third set of data, the second location with a second transceiver base station;
obtaining, in response to the associating the second location with a second transceiver base station, a second list of one or more mobile devices within an active range of the second base transceiver station; and
taking, between the first and second time, a snapshot of each mobile device identifier that was handed off between the first transceiver bases station and the second transceiver base station, wherein the each mobile device identifier corresponds to the first list and the second list of one or more mobile devices.

8. The system of claim 7, the method further comprising inferring a first mobile device identifier associated with the object of interest based on the taking a snapshot of each mobile device identifier that was handed off between the first transceiver bases station and the second transceiver base station.

9. The system of claim 7, the method further comprising generating a location prediction estimate of where the object of interest will move at a future time base on at least the identifying of the object of interest at the first location and at the second location.

10. The system of claim 7, the method further comprising generating a location prediction estimate of where the object of interest will move at a future time based on at least one of the following factors: a history of where the object of interest has been identified, a speed limit, real time data provided by a mobile device associated with the object of interest, a location interest associated with the object of interest, a geographical layout of the first location, and traffic data.

11. The system of claim 7, wherein the object of interest is a person's facial features and wherein a security camera identifies the person's facial features via an object recognition algorithm and responsively transmits the first set of data to the computing device.

12. The system of claim 7, wherein the object of interest is a person's voice and wherein a system that includes a microphone and a natural language processing module identifies the person's voice and responsively transmits the first set of data to the computing device.

13. A computer program product comprising a non-transitory computer readable storage medium having program code embodied therewith, the program code executable by a computing device to:
receive a first set of data indicating that an object of interest has been identified;
receive a second set of data indicating a first location of where the object of interest was identified, the first location corresponding to a geographical area;
associate, in response to the receiving of the first set of data and the second set of data, the first location with a first transceiver base station;
obtain, in response to the associating, a first list of one or more mobile devices that are within an active range of the first transceiver base station;
receive a third set of data indicating that the object of interest was identified at a second location;
associate, in response to the receiving of the third set of data, the second location with a second transceiver base station;
obtain, in response to the associating the second location with a second transceiver base station, a second list of one or more mobile devices within an active range of the second base transceiver station; and
determine which mobile device identifiers associated with the first transceiver base station are in common with the mobile device identifiers associated with the second transceiver base station, wherein the mobile device identifiers correspond to the first list and the second list of one or more mobile devices.

14. The computer program product of claim 13, wherein the program code is further executable by the computing device to infer a first mobile device identifier associated with the object of interest based on the determining which mobile device identifiers generated by the first transceiver base station are in common with the mobile device identifiers associated with the second transceiver base station and based on the receiving of the third set of data.

15. The computer program product of claim 13, wherein the program code is further executable by the computing device to generate a location prediction estimate of where the object of interest will move at a future time base on at least the identifying of the object of interest at the first location and at the second location.

16. The computer program product of claim 13, wherein the program code is further executable by the computing device to generate a location prediction estimate of where the object of interest will move at a future time based on at least one of the following factors: a history of where the object of interest has been identified, a speed limit, real time data provided by a mobile device associated with the object of interest, a location interest associated with the object of interest, a geographical layout of the first location, and traffic data.

17. The computer program product of claim 13, wherein the object of interest is a person's facial features and wherein a security camera identifies the person's facial features via an object recognition algorithm and responsively transmits the first set of data to the computing device.

\* \* \* \* \*